United States Patent [19]
Diepeveen

[11] 3,806,019
[45] Apr. 23, 1974

[54] WIRE BONDING APPARATUS

[76] Inventor: John C. Diepeveen, 1737 Kimberly Dr., Sunnyvale, Calif. 94087

[22] Filed: Apr. 14, 1971

[21] Appl. No.: 134,012

[52] U.S. Cl............................ 228/3, 29/480, 29/484, 29/628, 228/5, 228/13, 228/47
[51] Int. Cl............................................ B23k 21/00
[58] Field of Search.................. 228/3, 4, 5, 13, 47; 29/628, 484, 475, 480

[56] References Cited
UNITED STATES PATENTS

| | | | |
|---|---|---|---|
| 3,397,451 | 8/1968 | Anedission et al. | 228/4 |
| 3,314,582 | 4/1967 | Haigler | 228/1 |
| 3,313,464 | 4/1967 | Avedissian | 228/3 |
| 3,192,358 | 6/1965 | Lasch, Jr. et al. | 219/30 |
| 3,307,763 | 3/1967 | Rasimenoks et al. | 228/3 |
| 3,672,556 | 6/1972 | Diepeveen | 228/3 X |

Primary Examiner—J. Spencer Overholser
Assistant Examiner—Robert J. Craig
Attorney, Agent, or Firm—Townsend & Townsend

[57] ABSTRACT

A wire handling apparatus and method for cutting and removing the wire from a wire bond made by a wire bonding machine. The unit includes a torch and a wire clamp movable toward and away from the wire location, the wire clamp being operable to grip the wire secured to the bond and to pull it away after the wire has been cut by the flame of the torch. The wire clamp initially moves along a first path transversely of and toward the wire, then along a second path longitudinally of the wire and toward the bond, following which it grips the wire and moves along the second path in reverse while applying a longitudinal force to the wire to pull the wire straight outwardly from the bond, then again along the first path in the opposite direction. The wire separated from the bond is collected in an accumulator.

13 Claims, 12 Drawing Figures

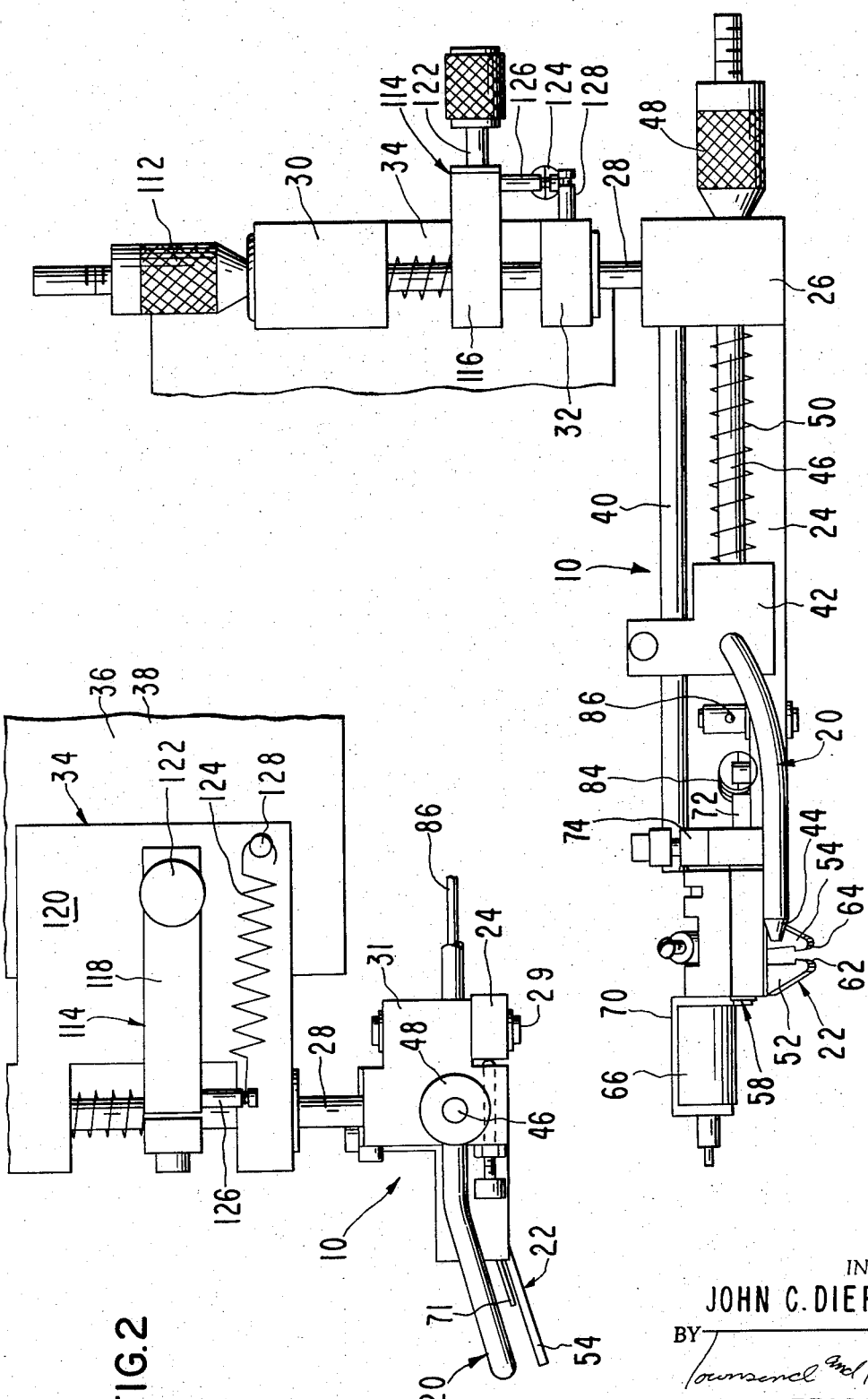

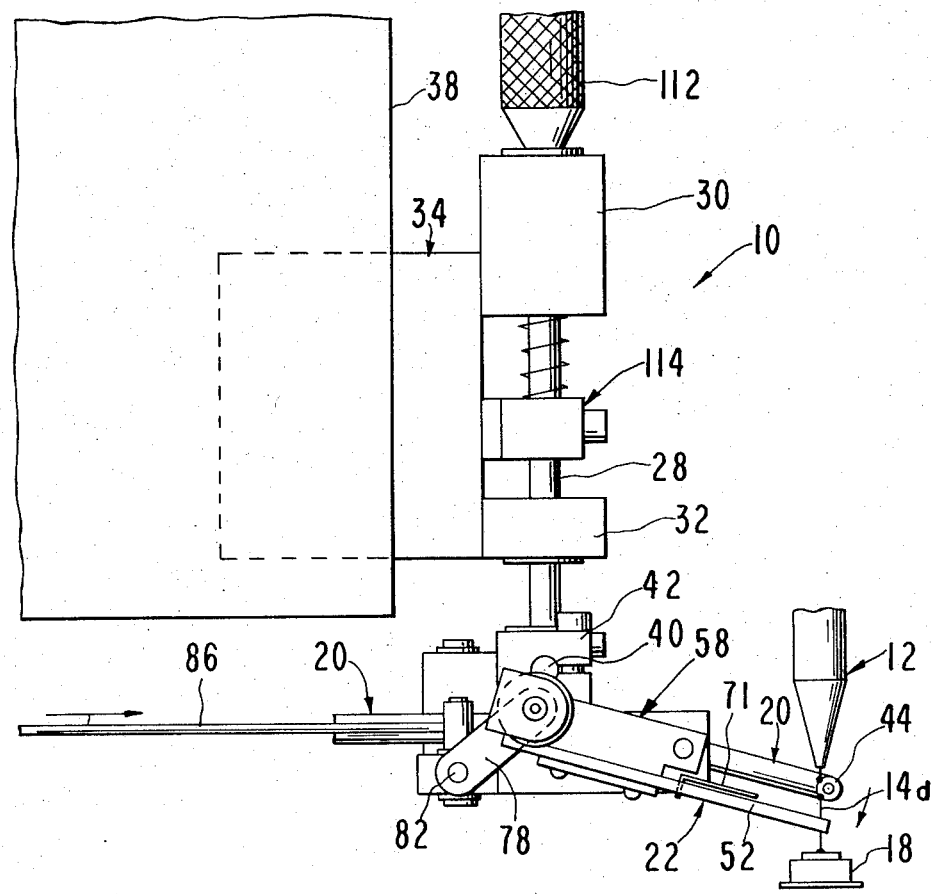
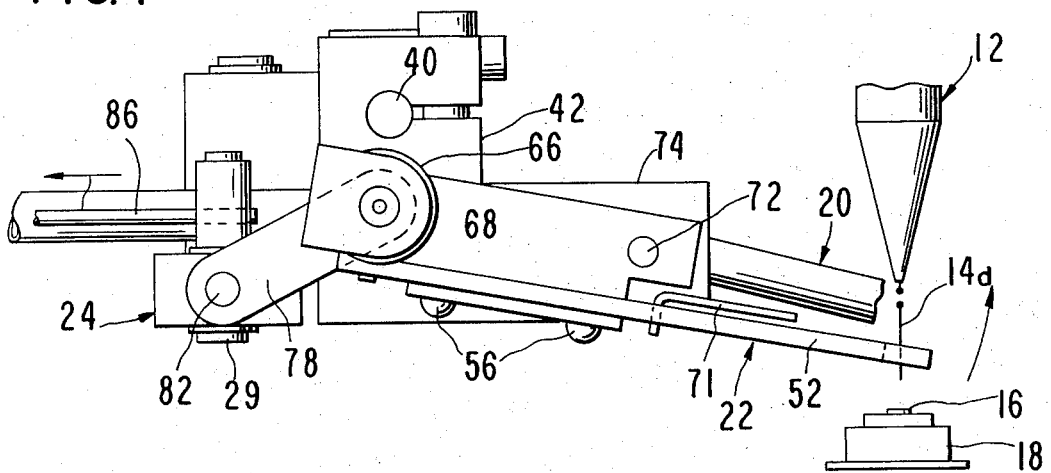

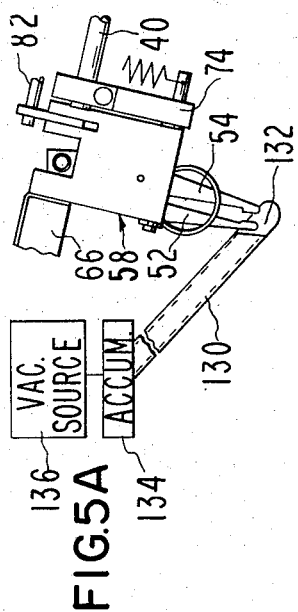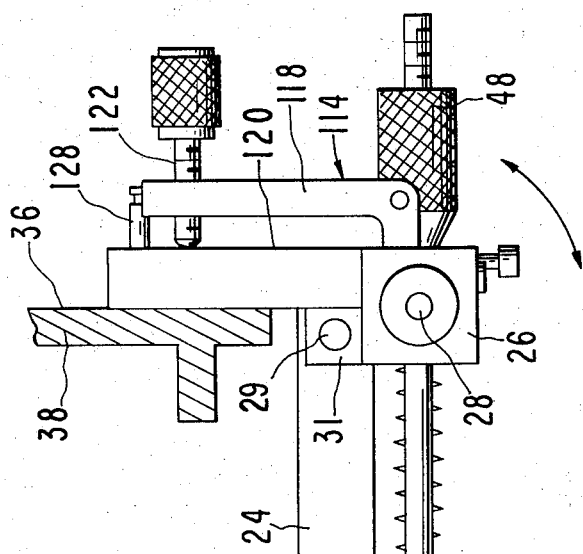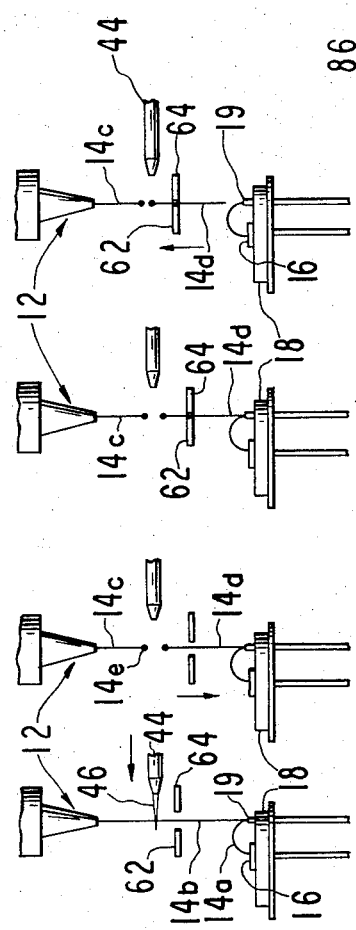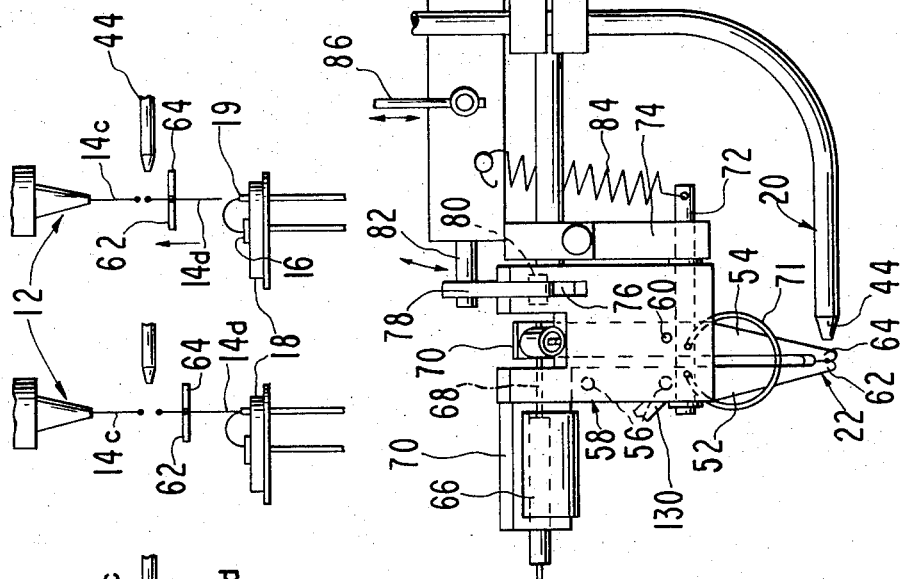

WIRE BONDING APPARATUS

This invention relates to improvements in wire bonding machines and, more particularly, to apparatus and method for removing excess wire from the bonds made by the operation of such a machine.

BACKGROUND OF THE PRIOR ART

Wire bonding machines, such as thermal compression bonders, are utilized to bond or connect very fine wires to various locations on an electronic component which includes a number of terminals or posts and a semiconductor chip in a space surrounded by the posts. It is necessary to connect a wire from each of a number of locations on the chip to a respective post; thus, for each wire there are at least two bond locations, namely, one at the post and the other or others at one or more corresponding locations on the chip. The first bond of each wire can be made at either location and it is necessary at the end of the second or last bond to separate the wire from the bond. The reason for this is that the wire is fed from a spool or other source through a heated capillary device and the wire must be cut so that subsequent bonds can be made.

It has been the conventional practice to sever the wire at a spaced location above the second or last bond to separate the upper wire stretch from that portion bonded to the electronic component. The severing action is generally done by the flame of a torch which is swept past the wire, the temperature of the flame being above the melting point of the wires so that the wire is cut. When this occurs, a bead is formed on the end of the wire by the melting of the same and one technique used to separate the wire portion still projecting outwardly from the second or last bond is to use a pair of tweezers to manually grip and pull such wire extension away from the bond. This is an extremely tedious job and oftentimes causes damage to bonds already completed since the wires are so fine, of the order of 1 mil or less, and the spacing between adjacent wires is extremely small.

Another technique used to remove the wire extension from the second or last bond is by means of a wire clamp disposed above the bond capillary. Both the capillary and the wire clamp move upwardly together to cause the wire to be severed from the second or last bond. Severe problems are encountered here because of the difficulty in manipulating and adjusting the jaws of the wire clamp. Moreover, the jaws must not deform the wire when the latter is clamped therebetween. Otherise, the portion of the wire between the jaws will be flattened and it will become jammed in the capillary since the latter has a cross section only slightly greater than the normal cross section of the wire.

Another problem encountered with the use of the wire clamp above the capillary is that the bead on the lower end of the wire is formed after the wire has been cut. When the bead is formed, the wire is not under tension and is merely suspended from the capillary. The position of the end of the wire with respect to the flame of the torch will oftentimes depend upon whether or not the wire has curled after being severed from the bond. If the wire is too far away from the torch, the flame will not be hot enough to make a bead of the proper size. If the wire is too close the the flame, the flame will be too hot and the resulting bead will be too large.

Still another problem arising due to the use of a wire clamp above the capillary is that the upward pull by the wire clamp on the wire stretches the wire and reduces its cross section. Since the wire is of approximately 1 mil in diameter, any stretching will not only weaken the wire but also, in all likelihood, will cause a bead formed thereon to be too small.

ADVANTAGES OF THE PRESENT INVENTION

The present invention circumvents the problems mentioned above by providing an apparatus and a method for cutting the wire after the second bond of the wire in a manner such that the bead on the wire will be uniform in size and the excess portion extending upwardly from the second bond will be cleanly separated therefrom without the need for human intervention, such as by the use of tweezers as mentioned above. To this end, the invention utilizes a torch and a wire clamp on one end of a shiftable arm wherein the arm is movable in a direction and through a distance sufficient to move the flame of the torch against the wire to be cut while, at the same time, the two jaws of the wire clamp simultaneously move onto opposite sides of the wire extension from the second bond, following which the wire clamp moves downwardly, grips the wire extension, then pulls it substantially straight upwardly through a predetermined distance, then moves the wire extension to a region remote from the component where the wire extension is drawn by suction into an accumulator. For a major portion of the path of travel of the arm, the torch and the wire clamp move together as a unit; however, as the wire clamp moves downwardly, the torch is stationary, the wire having already been cut by the flame. The bead formed by the cutting of the wire is uniformly formed on the lower end of the upper wire because the wire is not under excessive tension other than the usual predetermined wire drag applied to the wire. The wire can then be moved to the next bond position and the tool can apply a predetermined pressure on the bead on the end of the wire to effect the bond in a desired manner.

The way in which the wire clamp moves downwardly along the wire extension to be separated and then upwardly with the wire extension gripped therebetween prevents any damage to adjacent wires or their respective bonds. When the wire clamp first moves toward the wire with the torch along a first path, the wire clamp is sufficiently about the workpiece so as to avoid interfering with previously bonded wires. Then, as the flame of the torch severs the wire, the wire clamp moves downwardly toward the second bond until the ends of the jaws are in proximity to and slightly spaced above the second bond. Then the jaws are closed upon the wire extension, clamping the same, following which the jaws are elevated to thereby separate it from the second bond and to lift it above the same. Then the wire clamp traverses its horizontal path in reverse and to a location sufficiently remote to permit the tool to effect the bonding of the next wire. In this way, the remaining wires are kept intact and the bonds thereof are not adversely affected such as would be the case if the separated wire extension were to brush against or engage in any manner the loops of the bonded wires.

The primary object of this invention is to provide an apparatus and method for cutting a wire bonded to a terminal spaced from the zone of cutting and then to separate the wire extension projecting outwardly from the terminal without affecting the bond while assuring that the wire portion above the cut will have a bead of substantially uniform dimension.

Another object of this invention is to provide an apparatus and method of the type described wherein a wire clamp and a torch move together and cooperate with each other to successively severe the wire and then to grip and pull the excess wire extension from the bond in a manner so as not to interfere with other wires adjacent to the bond.

Another object of this invention is to provide an improved wire handling apparatus wherein an actuatable wire clamp and a torch are carried at one end of a swingable arm which moves toward and away from a location to be occupied by a bonded wire to be cut so that the flame of the torch can cut the wire as the wire clamp moves along the wire so that the wire will clamp when actuated and will grip the wire and pull the same to separate it from the bond for movement to a remote location, all without interfering with other structure adjacent to the wire.

Other objects of this invention will become apparent as the following specification progresses, reference being had to the accompanying drawings for an illustration of an embodiment of the apparatus.

In the drawings:

FIG. 1 is a front elevational view of the wire handling unit of this invention showing the way in which it is mounted on a support, such as the side of a wire bonding machine;

FIG. 2 is a side elevational view of the wire handling unit looking from the right in FIG. 1;

FIG. 3 is a view similar to FIG. 2 but showing the opposite side of the unit when the torch and the wire clamp of the unit are in operative positions with respect to a wire extending downwardly from a wire bonding tool and bonded to a terminal;

FIG. 4 is a view similar to FIG. 3 but on an enlarged scale showing the way in which the wire extension is separated from the terminal;

FIG. 5 is a top plan view of the unit;

FIG. 5A is a top plan view of the wire clamp of this invention;

FIGS. 6, 7, 8 and 9 are views illustrating the sequence of operation of the unit;

Figure 10:
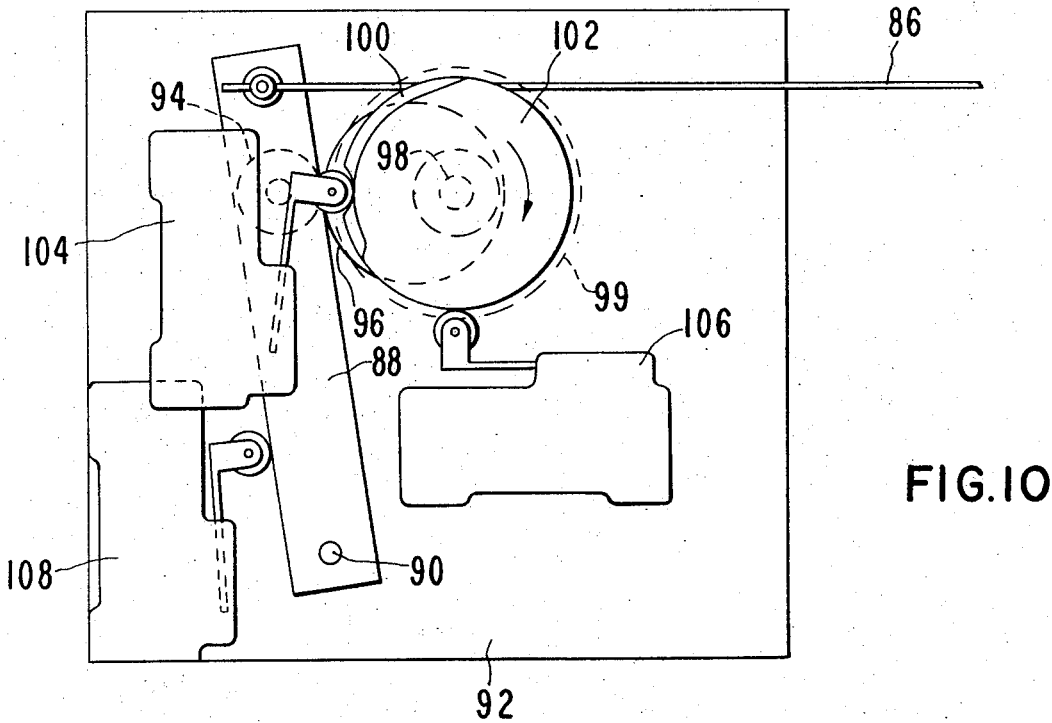
FIG. 10 is a fragmentary, top plan view of the means for shifting the wire clamp and the torch.

The wire handling unit of this invention is broadly denoted by the numeral 10 and is adapted to be utilized with a wire bonding machine of the type having a bonding tool 12 provided with a pointed end and having a capillary through which a very fine wire 14 passes. The tool operates to bond one end of wire 14 by thermal compression to an electronic component, such as an integrated circuit component 16 or the like, and the opposite end of the wire to a post or terminal 19. For purposes of illustration, the electronic component includes a semiconductor chip (FIGS. 4 and 6-9) on a base 18 which also supports a number of posts 19, the purpose of the tool being to bond a number of wires to various locations on chip 16 and to the various posts 19, only one of which is shown in each of FIGS. 6-9.

Unit 10 includes a wire cutting torch 20 and a wire clamp 22 mounted adjacent to one end of a generally horizontal arm 24 whose opposite end is pivotally connected by a pin 29 to a projection 31 extending laterally from a mounting member 26 secured to the lower end of a vertically disposed shaft 28. The shaft is mounted for rotation about its longitudinal axis by a pair of vertically spaced bearings 30 and 32 which are rigidly secured to a mounting plate 34 which, in turn, is rigidly secured to one face 36 of a support 38 forming a part of the wire bonding machine with which unit 10 is associated.

A rod 40 is rigid to member 26 and extends outwardly therefrom in substantial parallelism with arm 24. A bracket 42 is shiftably mounted on rod 40 intermediate the ends of the latter and operates to support torch 20, the latter having a substantially L-shaped configuration when viewing FIG. 5 and provided with a tip 44 at which a flame 46 (FIG. 6) is sustained when the torch is in operation. The torch is adapted to be coupled to a suitable source of combustible fluid, such as hydrogen. Tip 44 is in proximity with and spaced slightly above the outer portion of wire clamp 22 for a purpose hereinafter described.

A second rod 46 is also carried by and extends through member 26, rod 46 being below and parallel with rod 40. One end of rod 46 is coupled with bracket 42 to prevent rotation of the same on rod 40, rod 46 being shiftable relative to member 26 by virtue of an adjustment nut 48 threaded onto its opposite end, the nut bearing against the inner race of a bearing (not shown) which mounts rod 46 for longitudinal movement through member 26. A coil spring 50 surrounds rod 46 and biases bracket 42 away from member 26. Adjustment of the position of tip 44 relative to wire clamp 22 is effected by manipulating nut 48 to thereby shift bracket 42 on rod 40 until the desired position of tip 44 is reached.

Wire clamp 22 includes a pair of relatively shiftable jaws 52 and 54 which are disposed below tip 44 and slightly to one side thereof as shown in FIGS. 1 and 5. Also, the jaws are inclined when viewing FIG. 2 to properly position the same with respect to wire 14. FIG. 2 also shows how a portion of torch is inclined in the same manner as the jaws.

Jaw 52 is rigidly secured by a pair of screws 56 to a mounting plate 58; whereas, jaw 54 is pivotally mounted by a pin 60 on mounting plate 58 for movement relative to jaw 52. The outer, wire-engaging ends 62 and 64 of jaws 52 and 54 are adapted to clamp wire 14 therebetween when jaw 54 is pivoted about pin 60 in a clockwise sense when viewing FIG. 5. The actuation of a solenoid 66 causes jaw 54 to pivot, the solenoid having a shaft 68 coupled to the opposite end 70 of jaw 54. A coil spring 71 having a single convolution biases the jaws apart so that end 64 of jaw 54 is separated from end 62 of jaw 52 as shown in FIG. 1. However, when the solenoid is actuated, jaw 54 will pivot about pin 60 in a clockwise sense, causing end 64 to move toward end 62 and to clamp wire 14 therebetween as shown in FIG. 5.

Solenoid 66 is carried by a bracket 70 rigidly secured in any suitable manner to the side of mounting plate 58. A pin 72 carried on a bracket 74 pivotally mounts plate 58 for limited arcuate movement with respect to rod 40. Bracket 74 is clamped to and extends laterally from the outer end of rod 40. Plate 58 has a recess 76 for receiving one end of a lever arm 78, the latter being pivotally coupled by a pin 80 to plate 58. The opposite end of lever arm 78 is pivotally mounted on a pin 82 carried by and projecting outwardly from the end of arm 24. A coil spring 84 spans the distance between pin 72 and arm 24 and biases the same toward each other.

Means for reciprocating arm 24 includes a rod 86 secured at one end thereof to the arm and at its opposite end to one end of a bar 88, the latter being pivotally mounted at its opposite end by a pin 90 on a support plate 92 forming a part of the wire bonding machine with which unit 10 is associated. Bar 88 has a roller 94 which is in engagement with a rotatable, disk-like drive member 96 which is eccentrically mounted on the drive shaft 98 of a drive motor 99. Thus, rod 86, bar 88, drive member 96 and drive motor 99 define a power source for reciprocating arm 24 with respect to support 38.

A pair of cams 100 and 102 are also mounted on shaft 98 and engage the actuating arms of a pair of electrical switches 104 and 106, respectively, for sequentially actuating the same. Switch 104 controls drive motor 99, and switch 106 controls solenoid 66. A third, interlock switch 108 is carried by plate 92 and has its actuating arm engaging bar 88 so that switch 108 is actuated in response to the swinging movement of the bar.

Shaft 28 is adjustable in height in substantially the same manner as rod 46. To this end, an adjustment nut 112 is threadably mounted on the upper end of shaft 28 to raise and lower the same with respect to bearings 30 and 32. The pivoting movement of shaft 28 relative to the bearings is limited by an L-shaped lever 114 which has one section 116 rigidly secured to shaft 28 and a second section 118 which extends along and is spaced from the outer face 120 of plate 34. A screw 122 is threadably carried on the outer end of section 118 and bears against face 120 to define a stop to limit counterclockwise movement of shaft 28 and thereby arm 24 relative to support 38. A coil spring 124 connected at one end to a post 126 on lever 114 biases the same in a counterclockwise sense when viewing FIG. 5 since the opposite end of spring 124 is connected to a post 128 on plate 34.

OPERATION

Unit 10 is coupled with a wire bonding machine having tool 12 at a location such that torch 20 and wire clamp 22 are in proximity with and below the tip of the tool as shown in FIGS. 3 and 4. FIG. 5 illustrates the operative positions of the torch and the wire clamp when the same have been moved under the influence of arm 24 in a counterclockwise sense from respective inoperative positions (not shown) arcuately spaced from the operative positions. The angular movement can be of any suitable value, such as 30°, and, in their inoperative positions, the wire clamp and the torch permit tool 12 to move downwardly and to make bonds on component 16 and posts 19, the wire bonding machine having the capability of permitting the operator to manipulate the tool so that it is properly aligned to make the bonds.

As illustrated in FIG. 6, wire 14 has been bonded to two locations, namely, component 16 and a post 19. The wire extends between these two locations to form a loop 14a and extends upwardly from the bond on post 19 to form a straight stretch 14b since the second of the two bonds is made on the post. It is desired that stretch 14b be cut by the flame 46 of torch 20 and then to be separated from post 19. It is clear that wire stretch 14b could also extend upwardly from component 16, assuming the second bond of the wire is to the component rather than the post.

After the completion of the second bond, namely, the bond at post 19, tool 12 is elevated to a home position (FIGS. 6–9) at which time drive motor 99 coupled with shaft 98 (FIG. 10) is actuated so that bar 88 is moved in a clockwise sense when viewing FIG. 10, causing rod 86 to pivot arm 24 in a counterclockwise sense about the axis of sahft 28 when viewing FIG. 5. When screw 122 engages face 120 (FIG. 5), the pivotal movement of torch 20 ceases since rod 40 is rigid to member 26 which, in turn, is rigid to shaft 28. When this occurs, tip 44 of torch 20 is in position to intersect wire stretch 14b and, in such a position, cuts the wire to define an upper wire extension 14c and a lower wire extension 14d (FIG. 7). The flame also forms a bead 14e of substantially uniform size on the lower end of extension 14c.

As the torch and the wire clamp move toward their operative positions and before screw 122 engages face 120, jaw ends 62 and 64 move in a plane substantially parallel with the plane of movement of arm 24. However, when screw 122 engages face 120, arm 24 continues to pivot through a small arc in a counterclockwise sense relative to shaft 28 by virtue of its pivotal connection to member 26 by pin 29. This continued movement of arm 24 causes plate 58 to tilt downwardly and about pin 72 in a clockwise sense when viewing FIG. 4. When this occurs, jaw ends 62 and 64 move downwardly together, toward posts 19, i.e., they move in a plane transverse to the plane of movement of arm 24. During this downward movement, the jaws are open as shown in FIGS. 6 and 7.

As jaw ends 62 and 64 reach their lowermost locations, solenoid 66 is energized, causing jaw 54 to pivot about pin 60 and to, in turn, cause jaw ends 62 and 64 to clamp wire extension 14d (FIG. 8) therebetween.

Arm 24 immediately reverses direction since drive member 96 continuously rotates through a single revolution under the influence of drive motor 99. When this occurs, arms 24 continues to rotate relative to shaft 28 through the small arc about shaft 29 but in the opposite direction. During this small arcuate movement of arm 24, solenoid 66 is still energized so that jaw ends 62 and 64 remain clamped to wire extension 14d. Also, arm 78 causes plate 58 to pivot about pin 72 and in a counterclockwise sense when viewing FIGS. 3 and 4. This elevates jaw ends 62 and 64 and they apply an upward force to wire extension 14d, causing it to be separated from the bond on post 19 (FIGS. 4 and 9). Continued movement of arm 24 then causes the torch and wire clamp to move as a unit toward their inoperative positions. As the wire clamp moves toward its inoperative position, solenoid 66 is de-energized and extension 14d is released and drawn by suction into a tube 130 whose open end 132 is near the path of travel of the wire clamp. An accumulator 134 receives the wire extension, the accumulator having a chamber in fluid communication with tube 130 and coupled in any suitable manner to a vacuum source 136 shown only schematically in FIG. 5.

When the torch and the wire clamp reach their inoperative positions, they are again ready to move toward the wire to cut the same and to separate the wire extension connected either to a post 19 or to component 16. Before this occurs, however, the wire will be bonded at two additional locations, one on component 16 and the other on a post 19.

Figure 11:
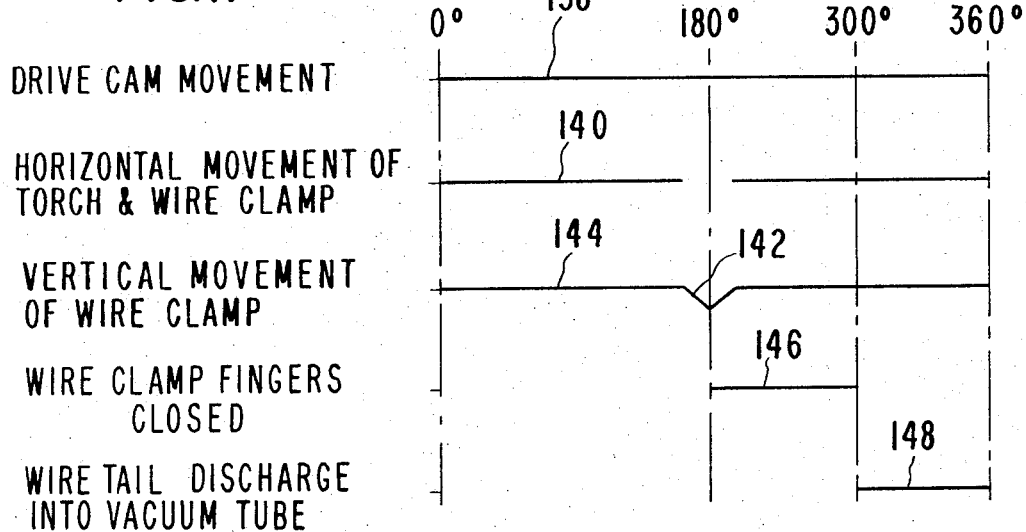
FIG. 11 is a graphic view of the sequence of operation of the unit.

FIG. 11 shows graphically the sequence of operations of the wire clamp, the torch and the solenoid for a complete revolution of shaft 98. Curve 138 represents the continuous rotation of drive member 96; and curve 140 represents the horizontal movement of the torch, such movement being interrupted and stopped by screw 122 as arm 24 continues to rotate to pivot the wire clamp about pin 72, such pivotal movement being shown in the V-shaped curve 142 which is coterminous with curve 144, the latter being identical with curve 140. Curve 146 indicates that the solenoid is energized when the wire clamp reaches the bottom of its path of downward travel and remains energized until the wire clamp reaches a location near open end 132 of tube 130. Curve 148 represents the suction of wire extension 14d into tube 130.

I claim:

1. Apparatus for removing a bonded wire from the bond thereof comprising: a support; an arm shiftably mounted on the support for movement from a first position spaced from the wire to a second position adjacent to the wire and return; torch means carried by the arm for cutting the wire at a location spaced from the bond when the arm is at least adjacent to said second position, whereby the wire is separated into two portions with one of the portions projecting outwardly from the bond; means carried by the arm adjacent to and below said cutting means for gripping said one portion and for moving the same outwardly of the bond thereof as the arm moves toward said first position; and means coupled with the arm for moving the same from the first position to the second position and return.

2. Apparatus for removing a bonded wire from the bond thereof comprising: a support; an arm shiftably mounted on the support for pivotal movement in a first direction from a first position spaced from the wire to a second position adjacent to the wire and return; means carried by the arm and movable relative thereto in a second direction transverse to the first direction for releasably gripping the wire and moving the same outwardly of the bond thereof as the arm moves toward said first position; and means coupled with the arm for moving the same from the first position to the second position and return.

3. A wire handling unit for a wire bonding machine comprising: an assembly including a wire clamp and a wire cutting torch; means coupled with the assembly and adapted to be coupled to a wire bonding machine for mounting the assembly thereon for movement toward and away from a location to be occupied by wire bonded by said machine, said torch being disposed to cause its flame to cut the wire at a region spaced from the bond thereof when the assembly is adjacent to said location to thereby form a wire extension projecting outwardly from the bond, said wire clamp being substantially on opposite sides of the wire when the latter is cut and being movable into gripping relationship with respect to said extension, said mounting means being movable away from said location after said extension has been gripped whereby said extension can be carried away from said location by the wire clamp; and means coupled to the assembly for moving the same toward and away from said location.

4. A wire handling unit for a wire bonding machine comprising: an arm adapted to be mounted on the wire bonding machine for movement relative thereto from a first position spaced from a location occupied by a wire bonded by the machine to a second position adjacent to said location and return; an actuatable wire clamp carried by the arm and having a pair of relatively shiftable jaws adapted to embrace a wire at said location and to grip the same when the wire clamp is actuated; means carried by the arm for actuating the wire clamp when said jaws embrace the wire; means carried by the arm adjacent to said wire clamp for cutting the wire at a region spaced from the bond thereof when the jaws substantially embrace the wire; and means coupled with the arm for moving the same from said first position to said second position and return.

5. A wire handling unit for a wire bonding machine comprising: an arm adapted to be shiftably mounted on the machine for movement along a first path from a first position spaced from a wire bonded by the machine to a second position adjacent to said wire and return; means mounted on the arm for cutting a wire at a location spaced from the bond thereof when the arm is at least adjacent to said second position to thereby form a wire extension projecting outwardly from the bond; actuatable means carried by said arm adjacent to said cutting means for gripping the wire extension, said gripping means being movable relative to the arm along a second path transversely of the arm movement as the arm alternately approaches and moves away from said second position; means carried by the arm for actuating the gripping means when the same is adjacent to the outer end of said second path; and means coupled with the arm for moving the same from the first position to the second position and return.

6. Apparatus for removing a bonded wire from the bond thereof comprising: a support; an arm shiftably mounted on the support for movement from a first position spaced from the wire to a second position adjacent to the wire and return; means carried by the arm for releasably gripping the wire and moving the same outwardly of the bond thereof as the arm moves toward said first position, said gripping and moving means being movable along a first path generally parallel with the path of the arm during a first portion of the movement of the arm toward said second position and along a second path transverse to the first path during a second portion of the movement of the arm, said gripping and moving means being movable into gripping relationship to the wire when the last-mentioned means is at least adjacent to the outer end of said second path; and means coupled with the arm for moving the same.

7. A wire handling unit for a wire bonding machine comprising: an arm adapted to be mounted on the wire bonding machine for rotation relative thereto in a generally horizontal plane from a first position spaced from a location occupied by a wire bonded by the machine to a second position adjacent to said location and return; an actuatable wire clamp shiftably mounted on said arm for movement transversely of the movement of the arm when the latter alternately approaches and moves away from said second position, said wire clamp adapted to move onto a wire at said location and to grip the same when the wire clamp is actuated; means carried by the arm for actuating the wire clamp when the same is disposed on the wire; a torch carried by the arm adjacent to said wire clamp for cutting the wire at a region spaced from the bond thereof; and means coupled with the arm for moving the same from said first position to said second position and return.

8. A wire handling unit as set forth in claim 7, wherein said actuating means includes a power device, and means for energizing the power device after said wire clamp has moved transversely of said arm movement.

9. A wire handling unit for a wire bonding machine comprising: an arm adapted to be mounted on the wire bonding machine for movement relative thereto from a first position spaced from a location occupied by a wire bonded by the machine to a second position adjacent to said location and return; an actuatable wire clamp carried by the arm and including a pair of relatively shiftable jaws adapted to move onto opposite sides of a wire at said location and to grip the same when the wire clamp is actuated; means carried by the arm for actuating the wire clamp when the same is disposed on the wire; a torch having a tip from which a flame can emanate, said torch being carried by the arm adjacent to said wire clamp for cutting the wire at a region spaced from the bond thereof, said jaws being below the tip of the torch; and means coupled with the arm for moving the same from said first position to said second position and return.

10. A wire handling unit for a wire bonding machine comprising: an arm adapted to be shiftably mounted on the machine for movement along a first path from a first position spaced from a wire bonded by the machine to a second position adjacent to said wire and return; means mounted on the arm for cutting a wire when the arm is at least adjacent to said second position; actuatable means carried by said arm adjacent to said cutting means for gripping the wire, said gripping means being movable relative to the arm along a second path transversely of the arm movement as the arm alternately approaches and moves away from said second position and in response to the movement of the arm along said first path; means carried by the arm for actuating the gripping means when the same is adjacent to the outer end of said second path; and means coupled with the arm for moving the same from the first position to the second position and return.

11. A wire handling unit for a wire bonding machine comprising: and arm adapted to be rotatably mounted on the machine for movement about a generally vertical axis along a first path from a first position spaced from a wire bonded by the machine to a second position adjacent to said wire and return; a torch; means coupled with the torch for shiftably mounting the same on said arm, said torch being adapted for cutting a wire when the arm is at least adjacent to said second position; means coupled with the torch mounting means for stopping the movement thereof as said arm approaches and is spaced from said second position; actuatable means carried by said arm adjacent to said cutting means for gripping the wire, said gripping means being movable relative to the arm along a second path transversely of the arm movement as the arm alternately approaches and moves away from said second position; means carried by the arm for actuating the gripping means when the same is adjacent to the outer end of said second path; and means coupled with the arm for moving the same from the first position to the second position and return.

12. A wire handling unit for a wire bonding machine comprising: an arm adapted to be shiftably mounted on the machine for movement along a first path from a first position spaced from a wire bonded by the machine to a second position adjacent to said wire and return; means mounted on the arm for cutting a wire when the arm is at least adjacent to said second position; an actuatable wire clamp carried by said arm adjacent to said cutting means and having a pair of relatively shiftable jaws adapted to embrace and grip a wire, said wire clamp being movable relative to the arm along a second path transversely of the arm movement as the arm alternatively approaches and moves away from said second position; an operable power device moving one of the jaws relative to and toward the other jaw for clamping a wire therebetween when the wire clamp is adjacent to the outer end of said second path; a programmed means for operating the power device as the arm moves along a portion of said first path and away from said second position; and means coupled with the arm for moving the same from the first position to the second position and return.

13. A wire handling unit for a wire bonding machine comprising: an arm adapted to be shiftably mounted on the machine for movement along a first path from a first position spaced from a wire bonded by the machine to a second position adjacent to said wire and return; means mounted on the arm for cutting a wire when the arm is at least adjacent to said second position to form a wire extension projecting outwardly from the bond; actuatable means carried by said arm adjacent to said cutting means for gripping the wire extension, said gripping means being movable relative to the arm along a second path transversely of the arm movement as the arm alternately approaches and moves away from said second position; means carried by the arm for actuating the gripping means when the same is adjacent to the outer end of said second path, whereby the wire extension is gripped and can be pulled away from the bond; suction means adjacent to said first path for collecting the wire extension after it has been pulled away from the bond and released by said gripping means; and means coupled with the arm for moving the same from the first position to the second position and return.

* * * * *